Dec. 3, 1957   A. W. SEYFRIED ET AL   2,815,194
MULTIPLE SPINDLE DRINK MIXER

Filed Aug. 16, 1954   8 Sheets-Sheet 1

FIG. 1.

INVENTORS.
ARTHUR W. SEYFRIED
PETER W. LAHR
BY Bertha L. MacGregor
ATTORNEY

Dec. 3, 1957  A. W. SEYFRIED ET AL  2,815,194
MULTIPLE SPINDLE DRINK MIXER

Filed Aug. 16, 1954  8 Sheets-Sheet 3

FIG. 3.

INVENTORS.
ARTHUR W. SEYFRIED
PETER W. LAHR
BY Bertha L. MacGregor
ATTORNEY

Dec. 3, 1957 A. W. SEYFRIED ET AL 2,815,194
MULTIPLE SPINDLE DRINK MIXER
Filed Aug. 16, 1954 8 Sheets-Sheet 4

INVENTORS.
ARTHUR W. SEYFRIED
PETER W. LAHR
BY Bertha L. MacGregor
ATTORNEY

INVENTORS.
ARTHUR W. SEYFRIED
PETER W. LAHR
BY Bertha L. MacGregor
ATTORNEY

Dec. 3, 1957　　A. W. SEYFRIED ET AL　　2,815,194
MULTIPLE SPINDLE DRINK MIXER

Filed Aug. 16, 1954　　8 Sheets-Sheet 6

FIG. 6.

INVENTORS.
ARTHUR W. SEYFRIED
PETER W. LAHR

BY Bertha L. MacGregor
ATTORNEY

Dec. 3, 1957   A. W. SEYFRIED ET AL   2,815,194
MULTIPLE SPINDLE DRINK MIXER

Filed Aug. 16, 1954   8 Sheets-Sheet 7

INVENTORS.
ARTHUR W. SEYFRIED
PETER W. LAHR

BY Bertha L. MacGregor
ATTORNEY

Dec. 3, 1957  A. W. SEYFRIED ET AL  2,815,194
MULTIPLE SPINDLE DRINK MIXER
Filed Aug. 16, 1954  8 Sheets-Sheet 8

INVENTORS.
ARTHUR W. SEYFRIED
PETER W. LAHR
BY Bertha L. MacGregor
ATTORNEY

United States Patent Office 2,815,194
Patented Dec. 3, 1957

2,815,194

MULTIPLE SPINDLE DRINK MIXER

Arthur W. Seyfried and Peter W. Lahr, Racine, Wis., assignors to Scovill Manufacturing Company, Waterbury, Conn., a corporation of Connecticut Application August 16, 1954, Serial No. 449,898

7 Claims. (Cl. 259—130)

This invention relates to motor driven drink mixers, and particularly to drink mixers provided with a plurality of agitators which are independently operable, whereby one drink may be mixed or a greater number may be prepared simultaneously. In the preferred embodiment shown herein, the mixer is provided with three motor driven drink mixing agitators.

An important object of the invention is to provide a plurality of identical motors and agitators which may be interchangeably located in center, left or right hand positions in the machine, and mounted so that their agitator shafts are non-parallel and extend at different angles to a vertical plane. The arrangement is such that each agitator shaft extends at an angle to the axis of the cup and each agitator is off center relatively to the cup in which it operates, whereby the agitator shaft is located rearwardly of the axial center of the cup where it crosses the plane of the top of the cup, and thus provides increased inspection room and ingredient-adding room at that side of each cup toward the operator. Further, the arrangement facilitates the placement of the cups in operative positions on the machine standard.

Another object of the invention is to provide a motor housing provided with integrally cast bosses on which the motors are mounted, said bosses for each of the motors differing from the others with respect to the angular disposition of the supporting surfaces, whereby the mounting of the motors with their agitators in their intended relationship is efficiently achieved.

Another advantage and object of the invention is the provision of resilient mounting means for the motors. Frequently the agitator shafts are struck by the cup in the placement thereof. To avoid injury to the agitators and to their mounting in the motor, we have made special provision for yieldingly mounting the motors in the housing.

Another object of the invention is to construct the motor housing, the standard and rear wall of the standard in such manner that efficient motor ventilation is assured.

Another object is to construct the standard casting without cores to materially reduce the cost.

These and other objects and advantages will be apparent from the drawings and the following specification.

In the preferred embodiment of our invention shown in the drawings, the multi-spindle drink mixer comprises a base 20 integral with the standard 21, on which is supported a motor housing 22, housing cover 23, and center band 24.

Figure 1:
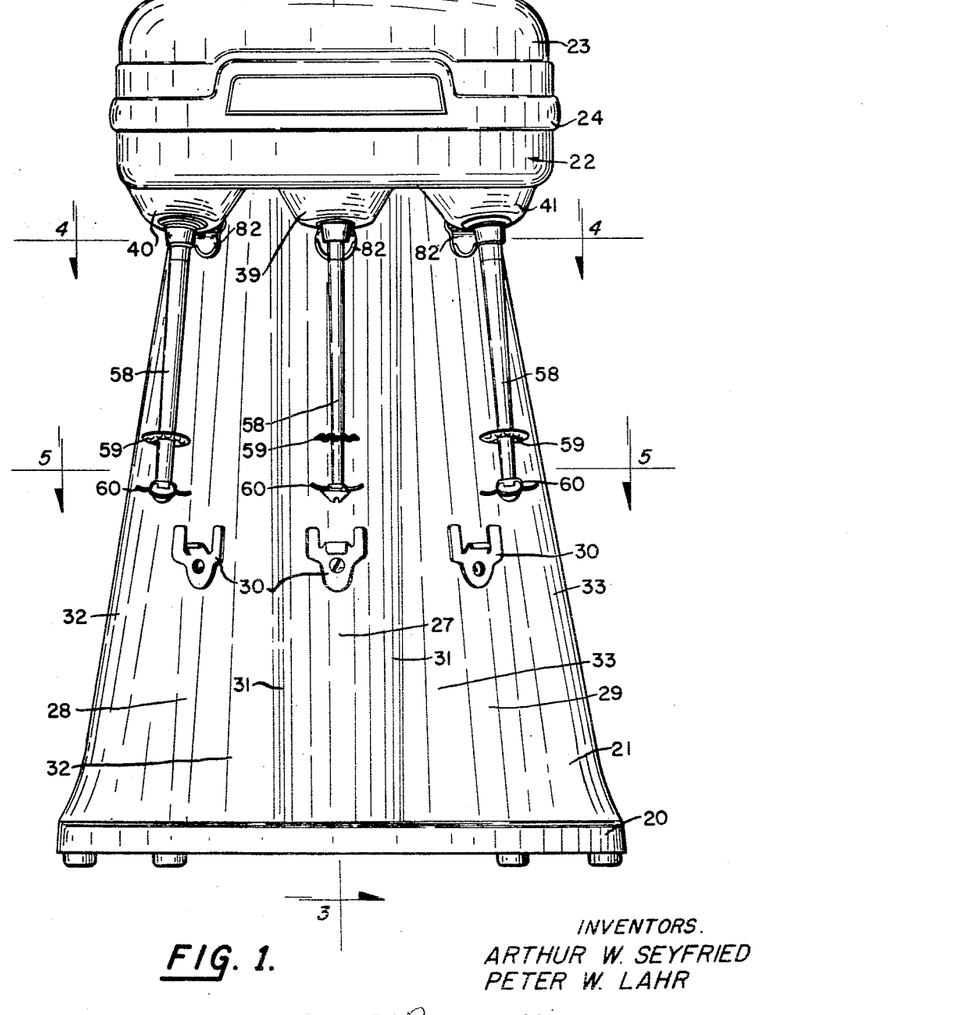
Fig. 1 is a front elevational view of a drink mixer embodying our invention.
Figure 2:
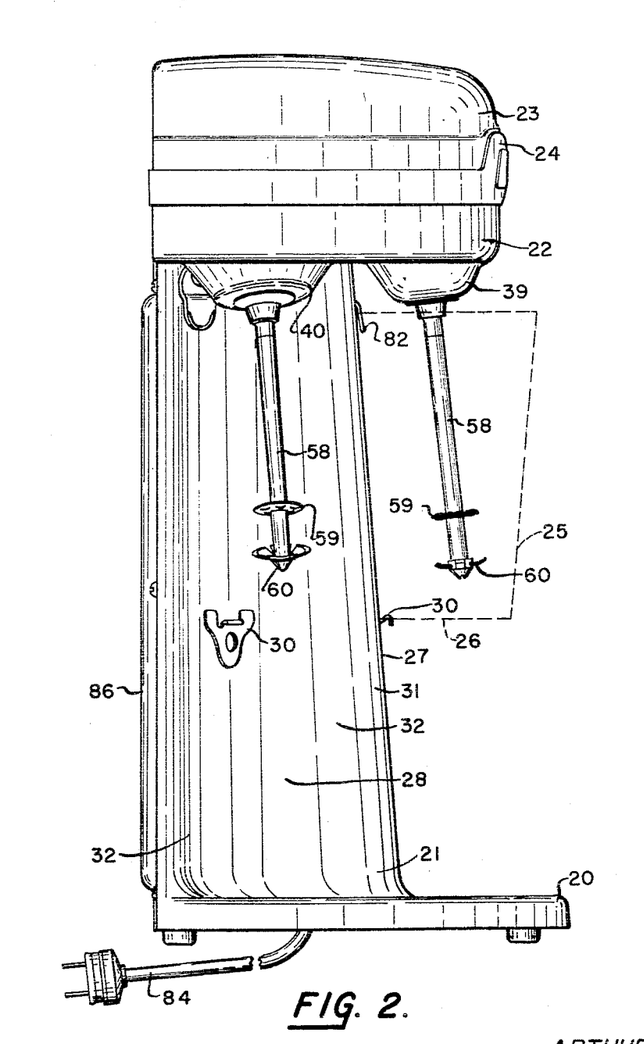
Fig. 2 is a side elevational view of the same.
Figure 4:
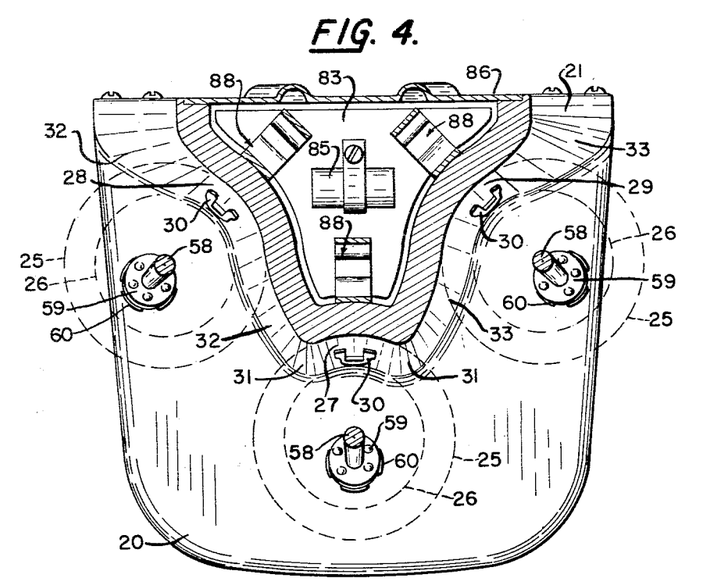
Figs. 4 and 5 are horizontal sectional views in the planes of the lines 4—4 and 5—5, respectively, of Fig. 1, looking downwardly as indicated by the arrows.
Figure 5:
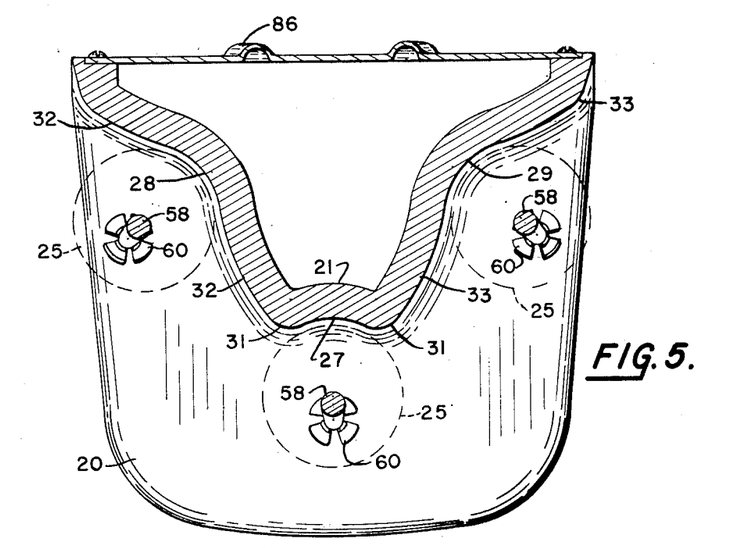

The contour of the standard 21 is best shown in Figs. 1, 4 and 5, being especially designed to accommodate three mixing cups 25, one of which is indicated in dotted lines in Fig. 2. The front wall of the standard 21 is provided with three groove-like areas 27, 28 and 29, each concave in horizontal cross section, and slightly inclined vertically between the base 20 and motor housing 22 to conform to the angle which the side wall of the cup 25 bears to its horizontal bottom 26. As shown in Figs. 4 and 5, the center one 27 of the three groove-like areas is located forwardly of the side areas 28, 29, but all three are accessible from the front of the machine for placement of the cups 25 on the supports 30 mounted on the standard. Each of the groove-like areas 27, 28 and 29 conforms in horizontal cross section to the arcuate form of the cup 25 so that when the cup is in position on the support 30, a part of one side fits snugly against the standard in one of said areas 27, 28 or 29.

The cup-contacting portion of the groove 27 is limited by convex surfaces 31, 31, at each side. The side grooves 28 and 29 are spaced from the convex surfaces 31, 31, by wider convex surfaces 32 and 33, respectively. The form of the face of the standard permits the operator of the machine to place the cups 25 on their supports 30 by front to rear movements, without requiring substantial space beyond the sides of the machine for placing the cups adjacent the areas 28 and 29. This is important when counter space is limited. The center cup 25 automatically finds its proper position adjacent the area 27 between the convex surfaces 31, 31, and the two side cups can be placed by contacting the convex surfaces 32 and 33 respectively, and moving the cups rearwardly and upwardly until the cup bottoms are seated on the supports. In Fig. 4 the upper rim of the cups 25 as well as their bottoms 26 are shown in dotted lines to indicate their positions relatively to the standard. When the center cup is in mixing position, the top of a side cup can pass the bottom of the center cup, thus allowing the side cups to be placed directly from in front of the machine.

Figure 7:
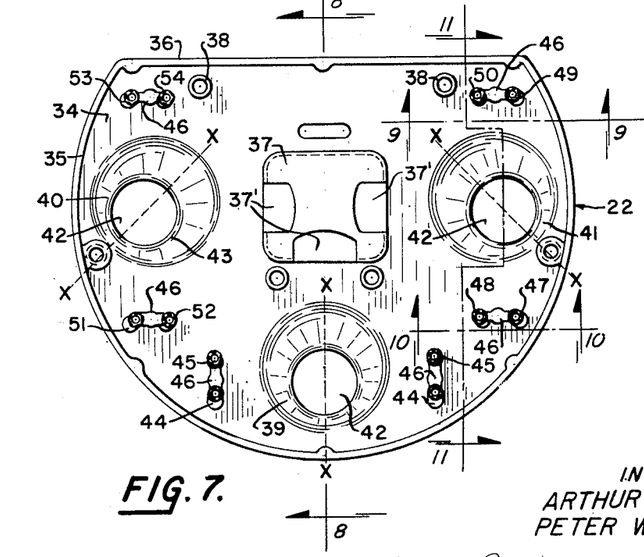
Fig. 7 is a top plan view of the lower motor housing.

The motor housing 22 is designed to house three identical motors and motor casings, which are mounted in the housing on non-identical supporting bosses, so that the agitator shafts of the motors are non-parallel and extend at different angles to a perpendicular line. The housing 22 without the motors and motor casings is best shown in Fig. 7. It comprises a substantially circular bottom wall 34, a vertical wall 35 extending upwardly from the circular portion of the bottom 34, and a vertical wall 36 which extends upwardly from the rear straight edge of the bottom of the housing. A raised portion 37 in the center of the bottom 34 of the housing 22 is provided with ventilating openings 37'. Bolts 38' connect the housing to the standard 21 through bolt holes 38.

Three dished members 39, 40 and 41, are formed in the housing bottom 34 to receive the motors and their casings. Each of said dished members is provided with an eccentrically located opening 42 through which extends a motor agitator which will be described hereinafter. As shown in Figs. 7, 8, 10 and 11, each of the dished members resembles an inverted, truncated, oblique cone, the wall 43 defining the so-called truncated end being inclined relatively to the horizontal bottom 34 of the motor housing of which it is a part. The said wall 43 of the center dished member 39 is inclined downwardly from front to rear of the machine, whereas the side dished members 40 and 41 are inclined downwardly in directions extending at approximately 45° to the diametric center or direction of inclination of said wall 43 of the dished member 39.

Figure 8:
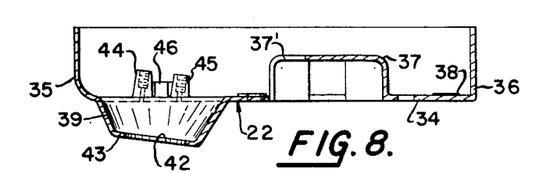
Figs. 8, 9, 10 and 11 are vertical sectional views taken in the planes of the lines 8—8, 9—9, 10—10 and 11—11, respectively, of Fig. 7.
Figure 9:
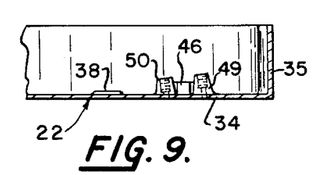
Figure 10:
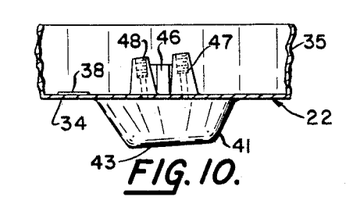

Motor supporting bosses rise integrally from the bottom 34 of the housing 22, at each side of the dished members 39, 40 and 41. Each set comprises two pairs of bosses. The bosses 44, 45, at opposite sides of the center dished member 39 are alike, each pair consisting of a taller boss 44 and a shorter boss 45, the top surfaces of which are parallel to the inclined lower surface 43 of the dished member 39 (Figs. 7 and 8). Preferably the bosses are connected in pairs by the webs 46.

The motor supporting bosses adjacent the side dished members 40 and 41 are in pairs located at right angles to the bosses 44, 45. The bosses of each pair are of different heights, and each pair differs in height from the other pair adjacent one of said dished members 40, 41.

Figure 11:
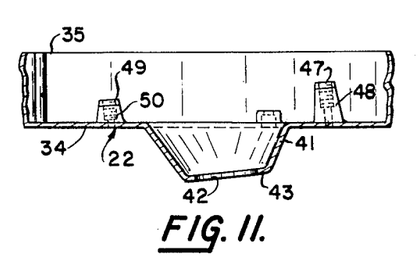
Figure 12:
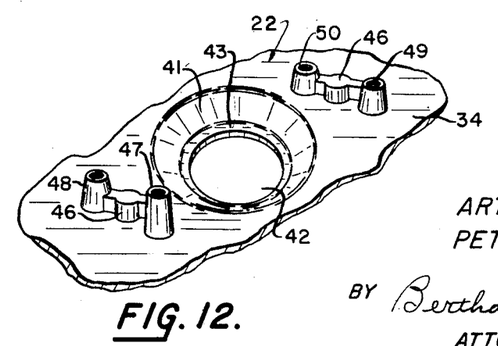
Fig. 12 is a perspective view of a portion of the lower motor housing, showing the bosses which support one of the side motors.
Figures 13, 14, 15, 16:
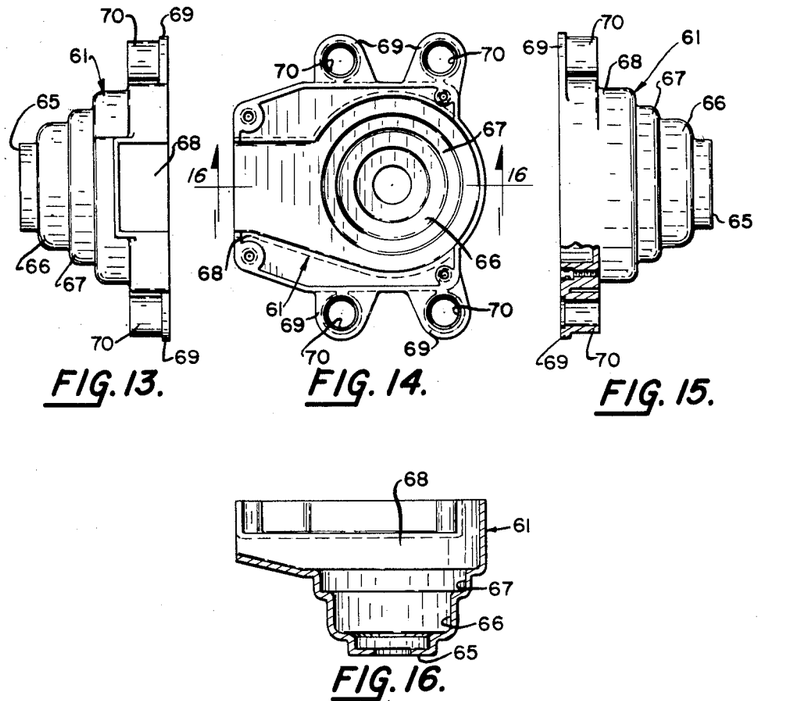
Fig. 13 is a front view of one of the motor casings.
Fig. 14 is a top plan view of the same.
Fig. 15 is a rear view of the motor casing.
Fig. 16 is a vertical sectional view in the plane of the line 16—16 of Fig. 14.
Figure 17:
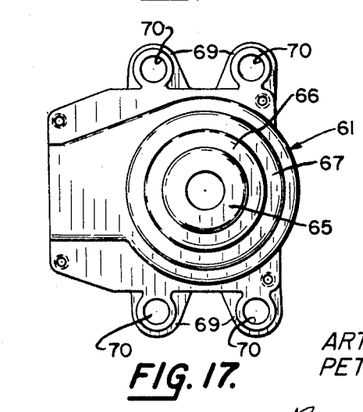
Fig. 17 is a bottom plan view of the motor casing.

Referring to the means for supporting the motor to be mounted in the right hand dished member 41, shown in Figs. 7, 11 and 12, said means comprises bosses 47, 48, located at the forward side, and bosses 49, 50, located at the rearward side of the said dished member 41. Each of these bosses differs in height from the other three, the boss 47 being taller than the boss 48, the boss 48 being taller than the boss 49, and the boss 49 being taller than the boss 50. The plane defined by the upper inclined surfaces of the four bosses 47–50 is parallel to the plane of the inclined surface 43 of the dished member 41.

The means for supporting the motor to be mounted in the left hand dished member 40, shown in Fig. 7, comprises bosses 51, 52, of one pair, and 53, 54, of a second pair, the boss 51 being taller than the boss 52, the boss 52 being taller than the boss 53, and the boss 53 being taller than the boss 54. The inclined plane defined by the upper surfaces of said bosses 51–54 is parallel to the inclined surface 43 of the left hand dished member 40.

The four bosses of different heights, having the inclined surfaces herein described for supporting the two side motors and their casings, provide a support inclined in the direction of the diametric center between similar halves of each of said dished members 40 and 41.

Before explaining the mounting of the motors on said supporting bosses, one of the motors and its motor casing will be described by reference to Figs. 3, 6, and 13–17, inclusive. The three motors are alike. Each comprises an armature winding 55 and an armature 56, fan 57, motor shaft 58 on which are mounted agitators 59 and 60, lower motor casing 61 and upper brush holder casing 62. The shaft 58 extends rotatably through a bearing 63 which is spaced from the lower casing 61 by a resilient jacket 64.

The motor casing indicated as a whole at 61 is shown in detail in Figs. 13–17 inclusive. The motor shaft 58 extends through the centrally apertured lower wall 65, said lower wall being dimensioned to fit within the openings 43 of the dished members 39, 40 or 41. The bearing 63 and its resilient jacket 64 fit within the chamber formed by the part 66 of the casing 61. The wall portion 67 is of larger diameter than the part 66 and houses the fan 57. The open upper portion 68 of the motor casing houses the armature and field coils. At each side of the casing 61 are two spaced apart ears 69 integral with depending tubular flanges or cylinders 70 for a purpose to be described.

Brush holders and the part of the upper casting in which the brush holders are mounted are indicated at 71, one at each side of the bearing 72 for the upper end of the motor shaft. The two casing members 61 and 62, with the motor parts between them, are connected together in spaced apart positions by bolts 73.

Figure 18:
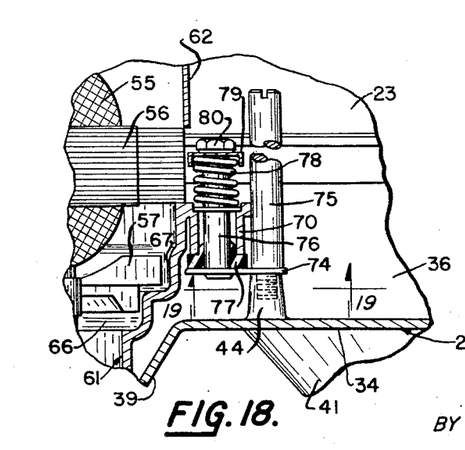
Fig. 18 is a fragmentary elevational view, partly in section, showing on an enlarged scale part of the motor housing, motor, motor casing, and means for yieldingly mounting the motor and casing in said housing.
Figure 19:
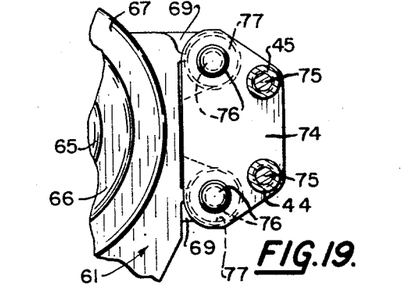
Fig. 19 is a horizontal sectional view in the plane of the line 19—19 of Fig. 18.

The assembled motor and casing units are mounted yieldingly in the motor housing 22. As shown in Figs. 18 and 19, the resilient mounting comprises a plate 74 seated on a pair of the bosses heretofore described, as for example, one of the pairs 44, 45, the plate 74 being secured in fixed position on the upper surfaces of the bosses by two threaded studs 75, the threaded portions of the studs 75 being engaged by the threaded bosses 44, 45. A pair of spring holding shafts 76 are mounted in the plate 74, with a rubber grommet 77 surrounding each shaft 76 and resting on the plate 74. The shafts 76 extend upwardly from the plate 74 through the two tubular flanges 70 at each side of the motor casing member 61 and project upwardly beyond said flanges 70 to receive a coiled spring 78, one end of which bears on the shoulder formed at the upper end of the tubular flange 70 and the upper end of which is retained by the washer 79 and nut 80 on the upper end of the shaft 76. There are two of the described resilient mountings at each side of each motor, whereby the tubular flanges 70 are resiliently mounted on the plate 74 and held between the rubber grommet 77 and coiled spring 78.

Figure 3:
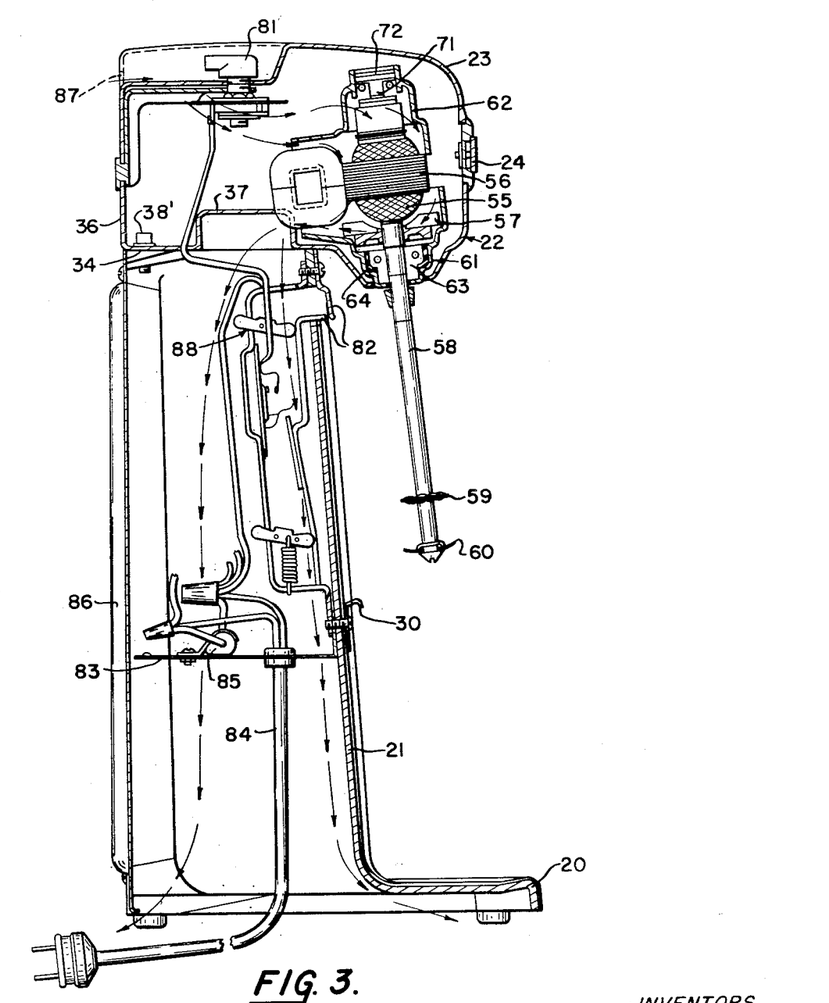
Fig. 3 is a vertical sectional view in the plane of the line 3—3 of Fig. 1.

In Fig. 3, we have shown the wiring which supplies electrical current to the motors, controlled by individual motor switches 81 on top of the housing 23, and cup operated switches 82 on the standard. The wiring need not be described in detail since it is not the subject of claims in this application.

A baffle plate 83 is mounted horizontally in the standard in such position that it prevents access to the wiring and switch mechanisms above it, and also serves to support the strain relief mounting of the cord 84. Condensers 85 also are mounted on the baffle plate 83.

A plate 86 closes the open back of the standard 21. Ventilating slots 87 in the rear wall of the housing cover 23 permit air currents to enter the motor housing 22, to pass around the motors and downwardly through the ventilating opening 37' in the bottom of the housing 22, down through the standard 21 and the open bottomed base 20, as indicated by arrows in Fig. 3.

Figure 6:
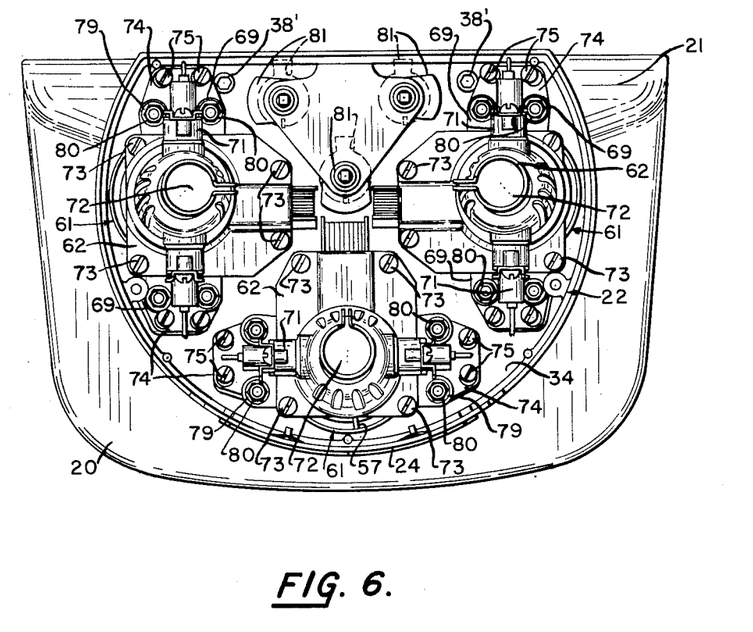
Fig. 6 is a top plan view of the mixer with the motor housing cover removed.

As is apparent from Fig. 6, the two side motors are located at 90 degree angles to the center motor, but they are mounted in the motor housing 22 on the mounting plates 74 and the sets of bosses heretofore described so that the inclination of the side motors is in divergent directions extending at approximately 45 degrees to the inclination of the middle motor, which is directly downwardly from front to rear. The dotted lines x—x extending through the diametric center of each of the three dished members 39, 40, 41 on Fig. 7 indicate the directions of the inclinations.

The mounting plates 74 are disposed at right angles to the axes of the agitator shafts, but due to the inclined supporting surfaces of the bosses on which the plates are mounted, the agitator shafts extend downwardly from the motor housing 22 in divergent directions, so that the agitators carried on the lower ends of the shafts operate in the cups toward the sides removed from the standard, as shown in Fig. 4, while the shafts 58 pass through the plane of the rim of the cups toward the sides nearest the standard, as shown in Fig. 2. As previously mentioned, this arrangement facilitates placement of the cups on the standard without using extra side room, and also provides inspection room and ingredient-adding room at that side of the cups nearest the operator.

The intersecting vertical planes in which the agitator shafts 58 are disposed are spaced apart about 45 degrees, providing the minimum space required for placement of the cups relatively to the agitators, whereas the motors and motor mounting means in the housing 22 are spaced apart 90 degrees. This arrangement conserves space and permits the motor housing 22 to be compact and of minimum width. The middle motor is located forwardly of an arc drawn through the axial center of the two side motors, using as the center of the arc the intersection of said vertical planes in which the agitator shafts are disposed. Although the agitator shafts are non-parallel, the plurality of motors and casings are identical, which is important for economical manufacture of the mixer.

Changes may be made in details of construction and in the form of parts without departing from the scope of our invention as defined by the appended claims.

We claim:

1. A motor driven multi-spindle drink mixer comprising a standard, a motor housing on the standard, three motors in the housing, a middle motor support for one of said motors comprising two identical bosses having upper surfaces inclined from front to rear, a side motor support for each of the other two motors at each side of said middle support comprising two bosses of different heights having upper surfaces inclined in a direction extending at an acute angle to the direction of inclination of said middle support surfaces, agitator shafts depending from said motors, the axes of said agitator shafts being disposed in intersecting vertical planes which are circumferentially spaced from each other forwardly of the standard, cup contacting areas on the standard opposite each agitator shaft, and a cup support on the standard in each of said cup contacting areas.

2. A motor driven multi-spindle drink mixer comprising a standard, a motor housing on the standard, three motors in the housing, a middle motor support for one of said motors comprising two identical bosses having upper surfaces inclined from front to rear, a side motor support for each of the other two motors at each side of said middle support comprising two bosses of different heights having upper surfaces inclined in a direction extending at an acute angle to the direction of inclination of said middle support surfaces, agitator shafts depending from said motors, the axes of said agitator shafts being disposed in intersecting vertical planes which are circumferentially spaced from each other forwardly of the standard approximately 45 degrees, cup contacting areas on the standard opposite each agitator shaft, and a cup support on the standard in each of said cup contacting areas.

3. A motor driven multi-spindle drink mixer comprising a standard, a motor housing on the standard, the bottom of the housing having integrally formed therein a plurality of dished members in the form of inverted oblique truncated cones, the center lines of said dished members intersecting rearwardly and being spaced approximately 45 degrees apart forwardly of the housing, a motor supported in each of said dished members, agitator shafts depending from said motors and extending through apertures in said dished members, cup contacting areas on the standard opposite each agitator shaft, and a cup support on the standard in each of said cup contacting areas.

4. A motor driven multi-spindle drink mixer comprising a standard, a motor housing on the standard, the bottom of the housing having integrally formed therein a plurality of dished members in the form of inverted oblique truncated cones, the center lines of said dished members intersecting rearwardly and being spaced approximately 45 degrees apart forwardly of the housing, a pair of motor supports adjacent each dished member, said supports having inclined upper surfaces, a motor located in each of said dished members and mounted on said supports, agitator shafts depending from said motors, cup contacting areas on the standard opposite each agitator shaft, and a cup support on the standard in each of said cup contacting areas.

5. A motor driven drink mixer comprising a standard, a motor housing on the standard, a motor casing provided with laterally extending ears at opposite sides, a tubular flange depending from each ear, a motor in the casing, a motor supporting plate mounted in the motor housing at each side of the motor casing, a spring holding stud rising from each plate, a resilient grommet resting on the plate and surrounding the stud, said tubular flange surrounding the stud and resting on the grommet, a resilient member surrounding the stud and resting on the upper end of the tubular flange, and means for retaining the resilient member under compression on the stud.

6. A motor driven drink mixer comprising a standard, a motor housing on the standard, a motor casing provided with laterally extending ears at opposite sides, a tubular flange depending from each ear, a motor in the casing, an agitator depending from the motor and extending at an angle to a perpendicular line, motor supporting means having an inclined upper surface integral with the housing, a motor supporting plate mounted on said supporting means at each side of the motor casing, a spring holding stud rising from each plate, a resilient grommet resting on the plate and surrounding the stud, said tubular flange surrounding the stud and resting on the grommet, a resilient member surrounding the stud and resting on the upper end of the tubular flange, and means for retaining the resilient member under compression on the stud.

7. A motor driven multi-spindle drink mixer comprising a standard, a motor housing on the standard, a middle and two side motor supports integral with the housing, the middle one of said supports being located at right angles to the side motor supports, each support comprising a plurality of threaded bosses integral with the housing, mounting plates secured to said threaded bosses, three motors, one motor supported in each of said supports, a casing for each motor provided with laterally projecting ears, means for retaining said ears on said mounting plates, resilient means spacing the ears from the plates, resilient means spacing the ears from said retaining means, agitator shafts depending from said motors, the axes of said agitator shafts being disposed in intersecting vertical planes which are circumferentially spaced from each other forwardly of the standard, cup contacting areas on the standard opposite each agitator shaft, and a cup support on the standard in each of said cup contacting areas.

References Cited in the file of this patent

UNITED STATES PATENTS

| | | |
|---|---|---|
| D. 161,577 | Ernst | Jan. 9, 1951 |
| 1,803,446 | Warrick | May 5, 1931 |
| 2,065,440 | Flaum | Dec. 22, 1936 |
| 2,117,919 | Summers | May 17, 1938 |
| 2,183,660 | Symons | Dec. 19, 1939 |
| 2,192,199 | Myers | Mar. 5, 1940 |